United States Patent
Bhatia et al.

(10) Patent No.: US 12,030,802 B2
(45) Date of Patent: Jul. 9, 2024

(54) EDGE STRESS USING DIFFERENTIAL COOLING

(71) Applicant: CORNING INCORPORATED, Corning, NY (US)

(72) Inventors: Vikram Bhatia, Painted Post, NY (US); Ah-Young Park, Daejeon (KR); Yousef Kayed Qaroush, Painted Post, NY (US); Zheming Zheng, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 174 days.

(21) Appl. No.: 17/602,324

(22) PCT Filed: Mar. 30, 2020

(86) PCT No.: PCT/US2020/025691
§ 371 (c)(1),
(2) Date: Oct. 8, 2021

(87) PCT Pub. No.: WO2020/210072
PCT Pub. Date: Oct. 15, 2020

(65) Prior Publication Data
US 2022/0185717 A1    Jun. 16, 2022

Related U.S. Application Data

(60) Provisional application No. 62/832,493, filed on Apr. 11, 2019.

(51) Int. Cl.
C03B 23/03      (2006.01)
B32B 7/12       (2006.01)
(Continued)

(52) U.S. Cl.
CPC ............ *C03B 23/0307* (2013.01); *B32B 7/12* (2013.01); *B32B 17/06* (2013.01);
(Continued)

(58) Field of Classification Search
CPC ... C03B 23/0307; C03B 23/0302; B32B 7/12; B32B 17/06; B32B 2250/02; B32B 2605/00; C03C 27/10
See application file for complete search history.

(56) References Cited

U.S. PATENT DOCUMENTS 2,897,632 A    8/1959   Dunipace
4,985,099 A    1/1991   Mertens et al.
(Continued)

FOREIGN PATENT DOCUMENTS

CA    2850252 A1    4/2013
CN    103764390 A   4/2014
(Continued)

OTHER PUBLICATIONS

Chinese Patent Application No. 202080034470.3, Office Action dated Nov. 3, 2022, 8 pages (English translation only), Chinese Patent Office.
(Continued)

*Primary Examiner* — Alicia J Weydemeyer
*Assistant Examiner* — Laura B Figg
(74) *Attorney, Agent, or Firm* — William M. Johnson; Payal A. Patel; Kevin M. Able

(57) ABSTRACT

A cold-formed glass laminate may include a first ply of 3D formed glass with a first thickness and a first strength. The first ply may include pre-formed residual compressive stresses in a peripheral edge portion adapted to offset tensile stresses resulting from a cold-forming process. The laminate may also include a second ply of 3D formed glass with a second thickness less than the first thickness and a second
(Continued)

strength greater than the first strength. An adhesive may be arranged between the first ply and the second ply and post-formed residual stresses in the peripheral edge portion of the first ply of the laminate may remain compressive. A method of forming a glass laminate with compressive edge stresses is also described.

7 Claims, 7 Drawing Sheets

(51) Int. Cl.
    *B32B 17/06*     (2006.01)
    *C03C 27/10*     (2006.01)
(52) U.S. Cl.
    CPC .......... *C03B 23/0302* (2013.01); *C03C 27/10* (2013.01); *B32B 2250/02* (2013.01); *B32B 2605/00* (2013.01)

(56) References Cited

U.S. PATENT DOCUMENTS

| | | | |
|---|---|---|---|
| 5,344,703 A | 9/1994 | Kovar et al. | |
| 5,430,257 A | 7/1995 | Lau et al. | |
| 5,591,245 A | 1/1997 | Salonen | |
| 6,015,619 A | 1/2000 | Schnabel et al. | |
| 7,070,863 B2 * | 7/2006 | Meerman .......... | B32B 17/10036 428/428 |
| 9,616,641 B2 | 4/2017 | Cleary et al. | |
| 9,670,714 B2 | 6/2017 | Berard et al. | |
| 9,919,496 B2 | 3/2018 | Michetti et al. | |
| 9,963,374 B2 | 5/2018 | Jouanno et al. | |
| 10,035,331 B2 | 7/2018 | Cleary et al. | |
| 10,175,802 B2 | 1/2019 | Boggs et al. | |
| 10,307,992 B2 | 6/2019 | Lestringant et al. | |
| 10,343,378 B2 | 7/2019 | Lestringant et al. | |
| 10,665,795 B2 | 5/2020 | Okada | |
| 10,800,143 B2 | 10/2020 | Cleary et al. | |
| 10,981,357 B2 | 4/2021 | Peck et al. | |
| 11,027,525 B2 | 6/2021 | Oh et al. | |
| 11,034,135 B2 | 6/2021 | Oh et al. | |
| 11,097,513 B2 | 8/2021 | Giron et al. | |
| 11,192,341 B2 | 12/2021 | Gier et al. | |
| 11,261,119 B2 | 3/2022 | Bhatia et al. | |
| 11,872,787 B2 | 1/2024 | Couillard et al. | |
| 2006/0127679 A1 | 6/2006 | Gulati et al. | |
| 2012/0328843 A1 | 12/2012 | Cleary et al. | |
| 2013/0295357 A1 | 11/2013 | Cleary et al. | |
| 2014/0087159 A1 | 3/2014 | Cleary et al. | |
| 2014/0127857 A1 | 5/2014 | Chen et al. | |
| 2015/0210583 A1 | 7/2015 | Amosov et al. | |
| 2015/0258750 A1 | 9/2015 | Kang et al. | |
| 2016/0193812 A1 | 7/2016 | Couillard | |
| 2016/0207290 A1 | 7/2016 | Cleary et al. | |
| 2016/0280591 A1 | 9/2016 | Cleary et al. | |
| 2017/0008377 A1 * | 1/2017 | Fisher ...................... | B60J 1/004 |
| 2017/0057205 A1 | 3/2017 | Notsu et al. | |
| 2017/0197384 A1 | 7/2017 | Finkeldey et al. | |
| 2017/0197870 A1 | 7/2017 | Finkeldey et al. | |
| 2017/0297308 A1 | 10/2017 | Golyatin et al. | |
| 2018/0154615 A1 | 6/2018 | Dohn et al. | |
| 2018/0237326 A1 | 8/2018 | Fredholm | |
| 2018/0281567 A1 | 10/2018 | Fisher et al. | |
| 2018/0326704 A1 | 11/2018 | Harris et al. | |
| 2018/0370194 A1 | 12/2018 | Claireaux et al. | |
| 2019/0012032 A1 | 1/2019 | Brandao et al. | |
| 2019/0054717 A1 | 2/2019 | Cleary et al. | |
| 2019/0161402 A1 | 5/2019 | Harris et al. | |
| 2019/0248124 A1 | 8/2019 | Cleary et al. | |

FOREIGN PATENT DOCUMENTS

| | | |
|---|---|---|
| CN | 105683118 A | 6/2016 |
| CN | 107848265 A | 3/2018 |
| CN | 108698922 A | 10/2018 |
| EP | 3038990 A1 | 7/2016 |
| EP | 3100854 A1 | 12/2016 |
| EP | 3242800 A2 | 11/2017 |
| JP | 2017-145190 A | 8/2017 |
| KR | 10-2017-0102537 A | 9/2017 |
| WO | 93/14038 A1 | 7/1993 |
| WO | 2006/110145 A1 | 10/2006 |
| WO | 2015/031148 A1 | 3/2015 |
| WO | 2015/092385 A1 | 6/2015 |
| WO | 2016/112059 A2 | 7/2016 |
| WO | 2017/023673 A1 | 2/2017 |

OTHER PUBLICATIONS

International Search Report and Written Opinion of the International Searching Authority; PCT/US2020/025691; dated Jun. 22, 2020; 15 pages; European Patent Office.

* cited by examiner

EDGE STRESS USING DIFFERENTIAL COOLING

CROSS-REFERENCE TO RELATED APPLICATIONS

This application is a national stage application under 35 U.S.C. § 371 of International Application No. PCT/US2020/025691, filed on Mar. 30, 2020, which claims the benefit of priority under 35 U.S.C. § 119 of U.S. Provisional Application Ser. No. 62/832,493 filed on Apr. 11, 2019 the content of which is are relied upon and incorporated herein by reference in its their entirety.

TECHNOLOGICAL FIELD

The present application relates to glass lamination and laminates. More particularly, the present application relates to glass lamination and laminates with improved residual edge stresses. Still more particularly, the present application relates to glass lamination and laminates with compressive residual edge stresses created through the use of differential cooling.

BACKGROUND

The background description provided herein is intended to generally present the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Automotive industries and other industries may utilize glass for windows, doors, side lights, and other portions of a system that are desired to be transparent or semi-transparent, for example. In the case of the automotive industry, glass may be used for glazing such as windshields, windows, sun roofs, moon roofs, and/or other portions of the vehicle. In many cases, these glass portions are laminated glass having two or more plies of glass laminated together with an adhesive.

Prior to lamination, the plies of the laminated glass may include flat or otherwise two-dimensional (2D) plies of glass, or arced, curved, or otherwise three-dimensional (3D) plies of glass may be used. In some cases, one of the plies may be substantially 2D and the other ply may be 3D. In the case of a ply of material being 3D formed, the 3D formed ply may have been cast as a 3D formed ply. Alternatively or additionally, the ply may have been cast or manufactured flat and then pre-formed (e.g., prior to lamination) using a hot forming process, a cold forming process, or another forming technique.

With the various different options for the pre-formed condition of each lamination of glass, the lamination process may involve forming the glass during and/or in addition to the lamination process. Like the ply forming process, the lamination process may be performed using a hot forming process, a cold forming process, a combination of hot forming and cold forming, or using other processes.

In a hot forming process, the ply of glass or the laminate may be heated to temperatures exceeding the glass transition point of the glass material. In some cases, these temperatures may exceed 500° C. While the material is beyond the glass transition point, the material may be formed to a desired shape and then cooled or controllably cooled, for example. In contrast, cold forming may be performed with the temperature of the ply of glass or the laminate at much lower temperatures such as less than 140° C. Cold forming may be a more energy efficient method of creating curved glass panels based on the elastic deformation of glass at relatively low temperatures.

Automotive glass may commonly include an outer ply of soda lime glass (SLG), an adhesive, and an inner layer of SLG. Alternatively, automotive glass may include an outer ply of soda lime glass (SLG), an adhesive, and an inner layer of a chemically strengthened glass. In some cases, the outer ply may be pre-formed using a hot forming process. The inner ply may be adhered to the outer ply with an adhesive and a cold forming process may be used to both form the inner ply and laminate it to the outer ply. In many cases, during the cold forming and laminating process, residual stresses may be created in the laminated materials. The residual stresses created may be a combination of the residual stresses in the pre-laminated materials. For example, the pre-formed outer ply may have residual stresses from the hot forming process. The inner ply may develop internal stresses from the cold-forming/laminating process. The residual stresses in the outer ply and the internal stresses of the inner ply may interact via the adhesive and result in residual stresses in each of the inner and outer plies in the laminate form (e.g., post-formed residual stresses).

The residual stresses in the laminate may be present throughout its lifetime. Where the residual stresses are tensile in nature, they can lead to problems or failures of the laminate. For example, the residual stresses may have a tendency to create cracking during lamination or more long-term issues such as delamination, crack propagation, optical distortion, and breakage during shipping, installation, or operation or use.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, a cold-formed glass laminate may include a first ply of 3D formed glass with a first thickness and a first strength. The first ply may have pre-formed residual compressive stresses in a peripheral edge portion adapted to offset tensile stresses resulting from a cold-forming process. The laminate may also include a second ply of 3D formed glass with a second thickness less than the first thickness and a second strength greater than the first strength. An adhesive may be arranged between the first ply and the second ply and post-formed residual stresses in the peripheral edge portion of the first ply of the laminate may remain compressive.

In one or more embodiments, a method of forming a glass laminate may include hot-forming a first ply of glass and inducing residual compressive stresses in a peripheral edge of the first ply by cooling the first ply of glass. During cooling, a temperature differential may be established between a peripheral edge of the glass and a center portion of the glass wherein the peripheral edge is a cooler temperature than the center portion. After cooling, the method may include cold-forming a second ply of glass to the first ply of glass and adhering the second ply to the first ply with an adhesive. The cold-forming may cause tensile stresses in the peripheral edge of the first ply that are counteracted by the residual compressive stresses such that the post-formed residual stresses in the first ply remain compressive.

While multiple embodiments are disclosed, still other embodiments of the present disclosure will become apparent to those skilled in the art from the following detailed description, which shows and describes illustrative embodiments of the present disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

DETAILED DESCRIPTION

The present application, in one or more embodiments, relates to a glass laminate and a method of forming the glass laminate where particular residual stresses in the laminate are compressive and, as such, help to resist cracking, delamination, or other flaws. In one or more embodiments, a glass laminate may include an outer soda lime glass ply and an inner chemically treated glass ply. The outer ply may be hot-formed to a desired shape such as that of a roof or a windshield. At the end of the hot-forming process, particular cooling steps may be taken to cool the peripheral edge of the outer ply more quickly than the center portion of the ply to induce compressive stresses in the peripheral edge of the outer ply. An inner ply may be laminated to the outer ply using a cold-forming process. This process may normally create tensile stresses in the peripheral edge of the outer ply. However, having induced compressive stresses in the peripheral edge of the outer ply, the cold forming may reduce the compressive stresses, but may not fully overcome them. As such, the laminate may maintain compressive residual stresses in the peripheral outer edge of the outer ply, which may cause the laminate to be more resistant to flaw development.

Figure 1:
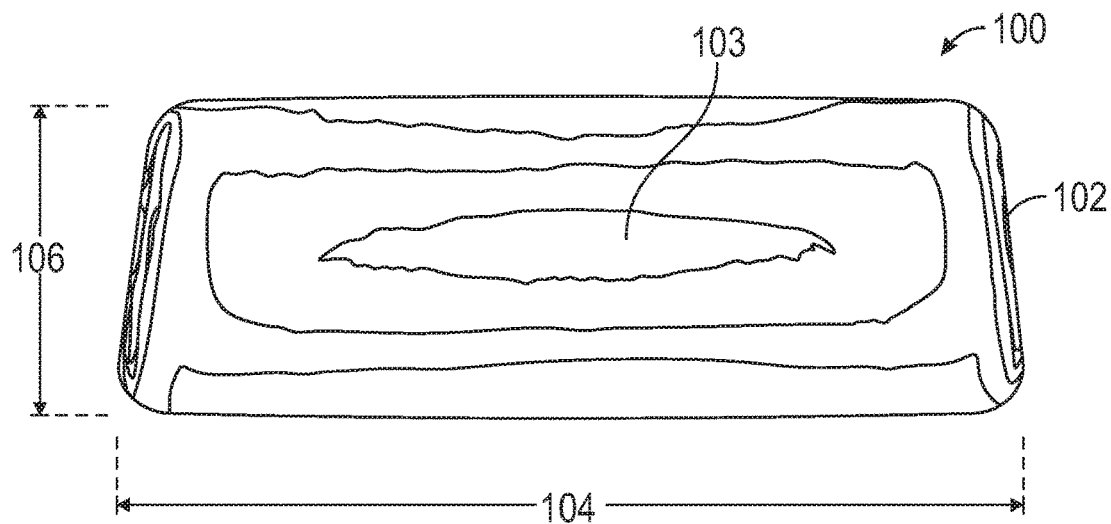
FIG. 1 is a perspective view of a laminate, according to one or more embodiments.

Referring now to FIG. 1, a perspective view of a glass laminate 100 is shown. The laminate may be particularly adapted for automotive use such as automotive glazing including, for example, a roof, a window, and/or a windshield. The laminate may be curved out of plane, doubly curved out of plane, or otherwise three-dimensionally (3D) shaped. The laminate may have a peripheral edge 102 sized and shaped for fitting into a frame opening of a particular vehicle or a series of vehicles. In one or more embodiments, the laminate 100 may have a width 104 ranging from approximately 300 mm to approximately 1,800 mm and a length 106 ranging from approximately 230 mm to approximately 1,600 mm. The laminate 100 may have a chord height between 0 mm and 45 mm. The chord height may include the perpendicular distance between the center line chord (e.g., the chord from the top to the bottom) and the arc of the glass surface. Where the chord height is zero, the glass laminate may form a cylindrical shape (e.g., the surface may have a single curvature not double curvature). The depth of bend of the glass laminate may range from approximately 5 mm to approximately 210 mm. The depth of bend may include the depth of the laminate from the projection plane (e.g., dimension from plane defined by four corners of curved glass to deepest point of glass). The laminate may have a radius of curvature along a primary bending curvature direction ranging from approximately 40 mm to approximately 5,000 mm and a radius of curvature along a secondary bending curvature direction ranging from approximately 740 mm to approximately 32,500 mm. The Gaussian curvature which may include the product of the principal curvatures at a point may range from approximately $0.14e^7$ mm$^2$ to approximately $15e^7$ mm$^2$. The principal curvatures may include a minimum and a maximum of the normal curvatures at a point and the normal curvatures may include curvature curves on the surface lying in planes including the tangent vector at a given point.

Figure 2:
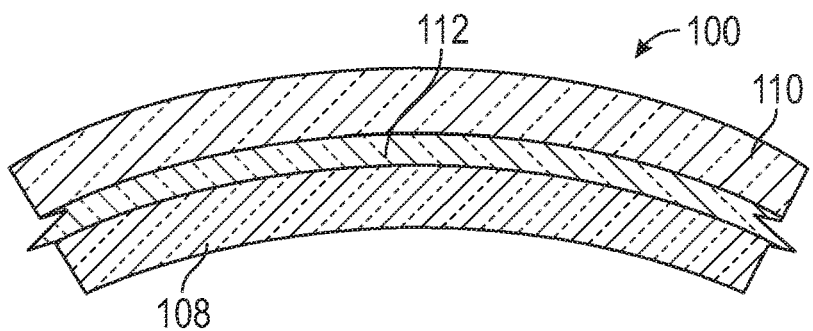
FIG. 2 is a schematic cross-sectional view of a laminate, according to one or more embodiments.

With reference to FIG. 2 and, as shown, the laminate 100 may include an inner ply 108 and an outer ply 110 secured to one another with an adhesive 112. The outer ply 110 may be a relatively thick ply of glass material and may include soda lime glass (SLG) or other glass material, such as a chemically strengthened glass, for example. The outer ply 110 may be transparent, substantially transparent, or the outer ply 110 may include textures or coatings to create tinting or semi-transparent effects for particular applications. The outer ply 110 may be considered outer because it may face outwardly toward the exterior environment when the glass laminate is installed in a vehicle, for example. The outer ply 110 may have a thickness ranging from approximately 1 mm to 4 mm or from approximately 1.5 mm to 3 mm, or the thickness may be approximately 2 mm or 2.1 mm. Still other thicknesses of the outer ply 110 of the laminate may be provided. Soda lime glass may be a relatively low strength glass and, depending on whether it has been heat treated or the type of heat treatment provided, the strength may vary relatively considerably. For example, soda lime glass may have a tensile capacity or tensile strength ranging from approximately 3-10 MPa depending on heat treatment. In any case, these tensile strengths may be considered relatively low and, as such, residual stresses, particularly residual tensile stresses, in soda lime glass can adversely affect its performance.

The inner ply 108 may be a relatively thin ply of glass material such as a chemically strengthened glass, thermally strengthened glass, or other glass material, such as non-strengthened soda lime glass, for example. In one or more embodiments, the inner ply 108 may include a mechanically strengthened glass utilizing a mismatch of the coefficient of thermal expansion between portions of the article to create a compressive stress region and a central region exhibiting a tensile stress. The inner ply 108 may be transparent, substantially transparent, or the inner ply 108 may include textures or coatings to create tinting or semi-transparent effects for particular applications. The inner ply 108 may be considered inner because it may face inwardly toward the interior cabin when the glass laminate is installed in a vehicle, for example. The inner ply 108 may have a thickness ranging from approximately 0.3 mm to 1.0 mm, or from 0.5 mm to 0.9 mm, or the inner ply may have a thickness of approximately 0.6 mm, 0.7 mm, or 0.8 mm. Still other thickness of the inner ply 108 of the laminate may be provided. Chemically strengthened glass may be a relatively high strength glass and may have a tensile capacity of approximately 90-110 MPa, or approximately 95-105 MPa, or approximately 100 MPa. The tensile strength of chemically strengthened glass may be relatively high when compared to that of soda lime glass, which may make the chemically strengthened glass suitable for use on the interior of automotive glazing where bending forces may be higher when an impact to the glass occurs.

The adhesive layer 112 may be arranged between the inner ply 108 and the outer ply 110 and may be adapted to secure the inner ply 108 to the outer ply 110. The adhesive 112 may be a transparent or a substantially transparent adhesive. For example, in one or more embodiments, the adhesive layer 112 may include one or more transparent synthetic sheets. Additionally or alternatively, the adhesive layer 112 may include a transparent or substantially transparent resin. The adhesive layer 112 may be placed between the outer ply 110 and the inner ply 108 during a lamination process and may secure the outer ply 110 to the inner ply 108 during and/or after the lamination is complete.

Figure 3:
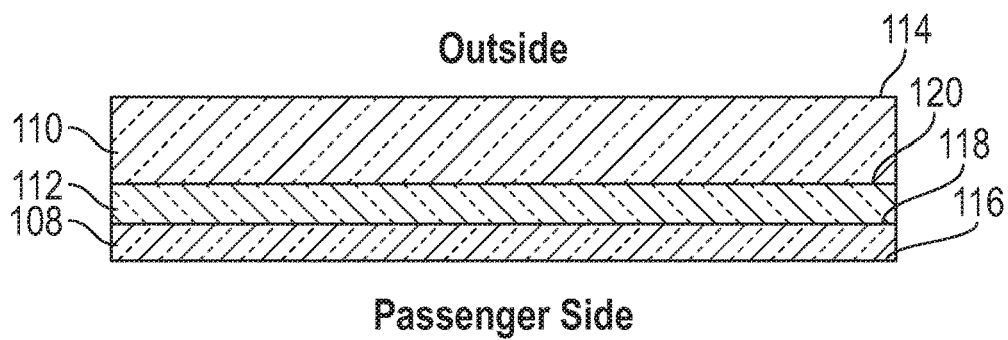
FIG. 3 is a close-up schematic cross-sectional view of a laminate identifying the several surfaces thereof, according to one or more embodiments.

For purposes of this discussion and as shown in FIG. 3, the laminate 100 may include a series of surfaces. For example, the laminate may include an outer surface 114, which may be the surface of the laminate facing the outside of a vehicle when the laminate 100 is installed. The laminate 100 may also include an inner surface 116, which may be the inside or passenger side surface when the laminate 100 is installed. Each of the inner ply 108 and the outer ply 110 may also include respective adhesive side surfaces 118, 120.

Figure 4A:
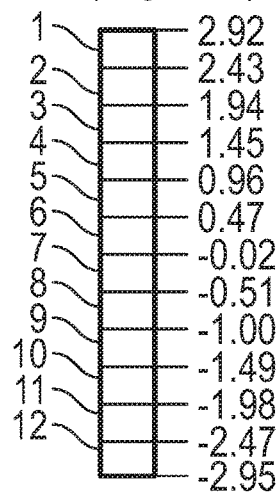
FIG. 4A is a diagram of the stress distribution in an inner surface of an outer ply of a glass laminate after cold-forming, according to one or more embodiments.
Figure 4A:
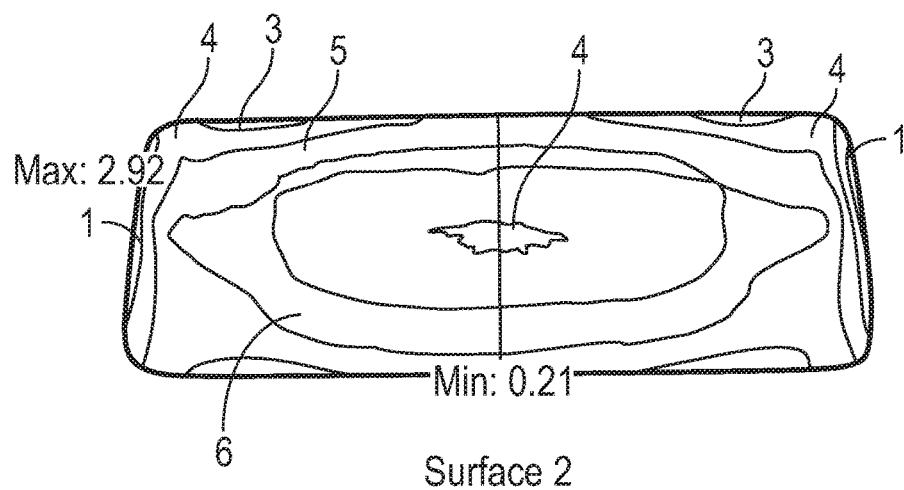
Figure 4B:
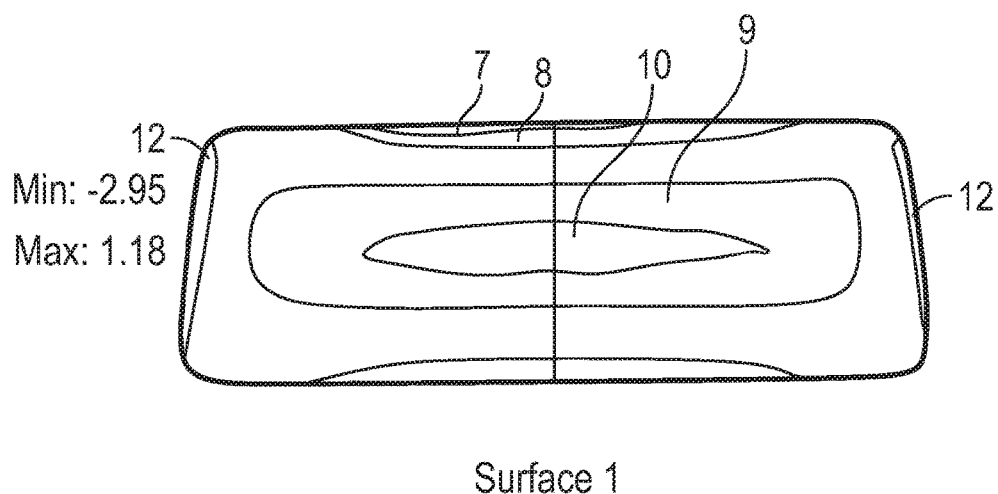
FIG. 4B is a diagram of the stress distribution in an outer surface of an outer ply of a glass laminate after cold-forming, according to one or more embodiments.

Referring to FIGS. 4A and 4B, the laminate 100 may develop surface stresses when it is formed according to the approach discussed above (e.g., hot formed outer ply followed by cold forming/laminating to inner ply). For purpose of depiction, each stress zone has been assigned a zone number. As shown in FIG. 4B, the outer surface 114 may include stresses along the peripheral edge ranging from approximately −3 MPa to approximately 1 MPa. The outer surface 114 may include stresses near the center of approximately 1.5 MPa to 2 MPa. In contrast, the adhesive side surface 120 of the outer ply 110 may include stresses along the peripheral edge ranging from approximately 0.2 MPa to approximately 3 MPa. The adhesive side surface 120 of the outer ply 110 may include stresses near the center closer to 1 MPa. As such, depending on the heat treatment of the outer ply 110 of glass, the stresses in the glass due to cold forming, particularly on the adhesive side surface 120 of the outer ply 110 and near the peripheral edge 102, may approach the tensile strength of the glass. This can lead to breakage, cracking, or the other problems mentioned. It is to be appreciated that while the inner ply has been said to be cold formed and laminated to the outer ply from a flat or substantially flat condition, in some cases, the inner ply may be partially or fully hot-formed prior to cold forming and laminating it to the outer ply.

Figure 5:
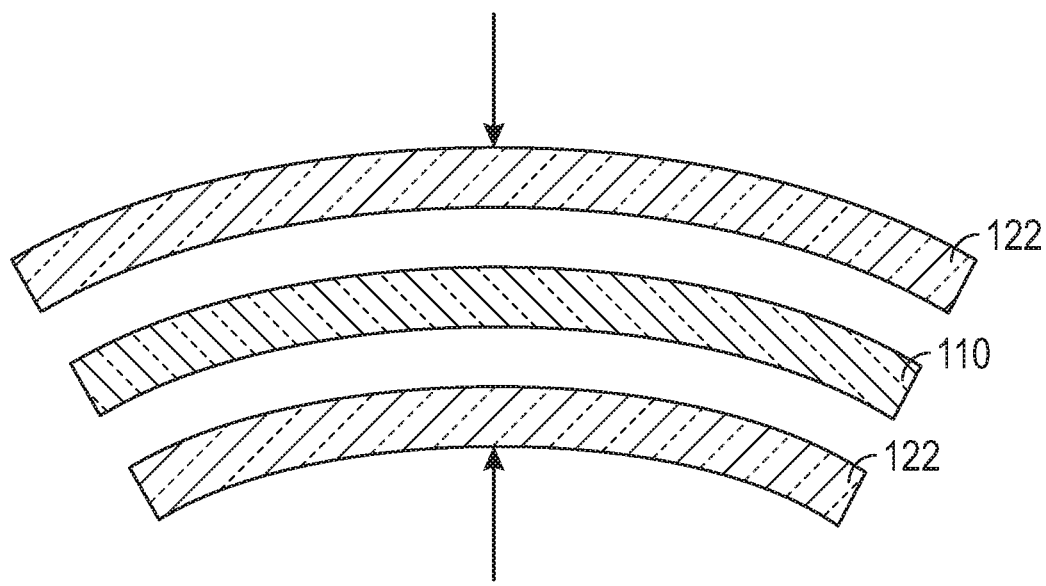
FIG. 5 is a schematic diagram showing a hot-forming process of a ply of glass to be used in a laminate, according to one or more embodiments.

Particular approaches to manufacturing the laminate 100 may be provided herein to reduce and/or alleviate the risks of cracking and other problems in the outer ply 110 of the laminate 100. Referring to FIG. 5, a hot forming process may be used to pre-form the outer ply 110 of glass. The hot forming process may include heating the ply of glass 110 to its glass transition point (e.g., approximately 500° C.) and forming the glass to a desired shape by applying pressure to the surfaces of the glass. For example, a press may be used together with pre-shaped dies 122 to form the glass ply 110 to the desired shape. With the glass formed into its desired shape, the glass may be allowed to cool, dropping the temperature below the glass transition point, and, thus, securing the shape of the ply 110.

Figure 6:
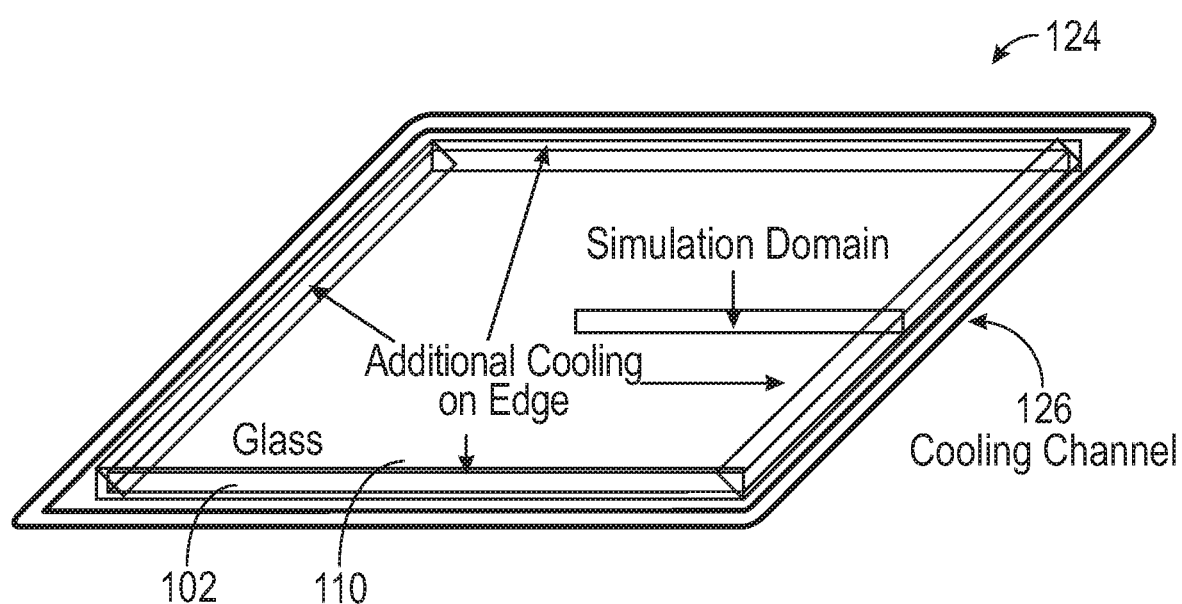
FIG. 6 is a schematic diagram showing a differential cooling process on a hot-formed ply of glass, according to one or more embodiments.

In one or more embodiments, an edge cooling system 124 may be provided to increase the rate of cooling of the exterior surfaces of the pre-formed outer ply 110. The increased cooling of the exterior surfaces along the peripheral edge may cause compression in these surfaces due to the later pulling as the interior of the glass in these peripheral regions cools (e.g., similar to tempered glass), causing compression in the peripheral edge 102 of the outer ply 110. As shown in FIG. 6, an edge cooling system 124 may be adapted for providing cooling to the peripheral edge 102 of a pre-formed outer ply 110 of a laminate. As shown, the cooling system 124 may include a system for directing cool air or other gas at the outer peripheral edge 102 of the ply 110 of glass. As shown, the system 124 may include a cooling channel 126 configured to carry and deliver gas along a peripheral edge 102 of the ply of glass and release and/or direct the gas toward the glass. The system may include a source of air or other gas such as a pump or a pressurized gas chamber in fluid communication with the channel 126 via a conduit. The channel 126 may include a tube or channel formed to substantially closely match the outer peripheral shape of the glass ply such that it may be arranged adjacent to the glass ply 110 and release air directed at or near the peripheral edge 102 of the glass ply 110. The tube or channel 126 may include a round, square, triangular, or other cross-sectional shape and may include orifices arranged along its length to direct air or gas at the glass ply 110. In one or more embodiments, the orifices may include nozzles for jetting the air and/or more particularly focusing the flow of air at the glass ply. The tube or channel 126 may include a single tube or channel or a combination of tubes or channels. In one or more embodiments, several arrangeable tubes or channels may be used such that differing sizes and shapes of glass plies may be accommodated by rearranging the tubes or channels depending on the shape of the glass ply. The cooling system 124 may be incorporated into the glass forming system or it may be separated therefrom where, for example, the glass may be cooled in the glass forming system or apart therefrom, as the case may be. In the case of incorporation, for example, a cooling channel or tube 126 may be built into a press plate or mold or another incorporation technique may be used.

While a cooling tube/channel system 124 has been described, still other approaches to cooling the peripheral edge 102 may be used. For example, a metal or other conductive material may be used to cool the edge 102 of the glass ply 110. In one or more embodiments, a relatively cold bar or tube may be placed adjacent or in contact with the peripheral edge 102 or edges of the glass ply 110. The bar or tube may include a circulating coolant, for example, that may maintain the bar or tube at a cool temperature and, as such, may create a reservoir for drawing the heat out of the peripheral edge 102 of the glass ply 110.

Figure 7:
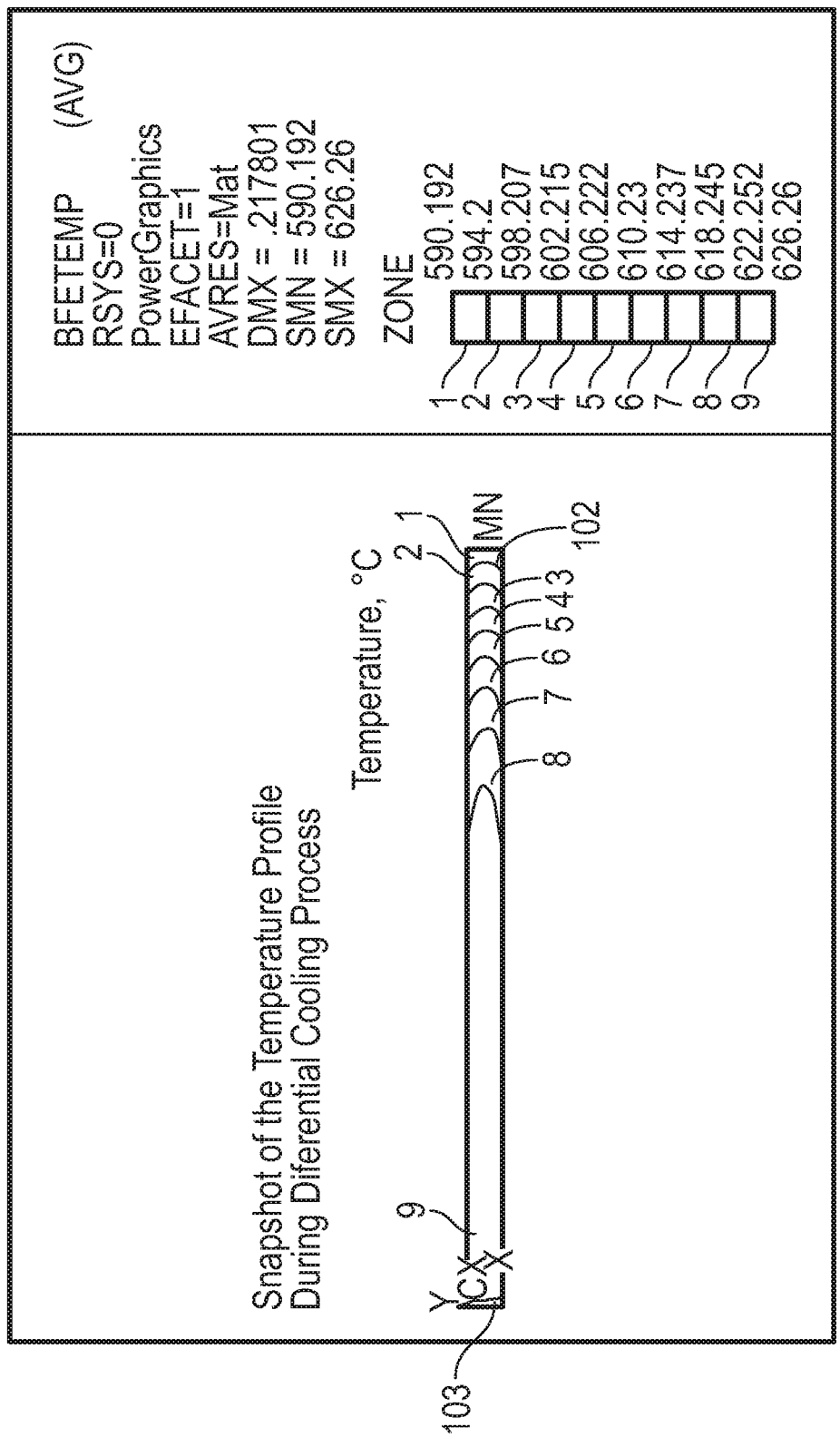
FIG. 7 is a cross-sectional stress diagram showing temperature distributions in an outer ply of a laminate during the differential cooling process of FIG. 6, according to one or more embodiments.
Figure 8:
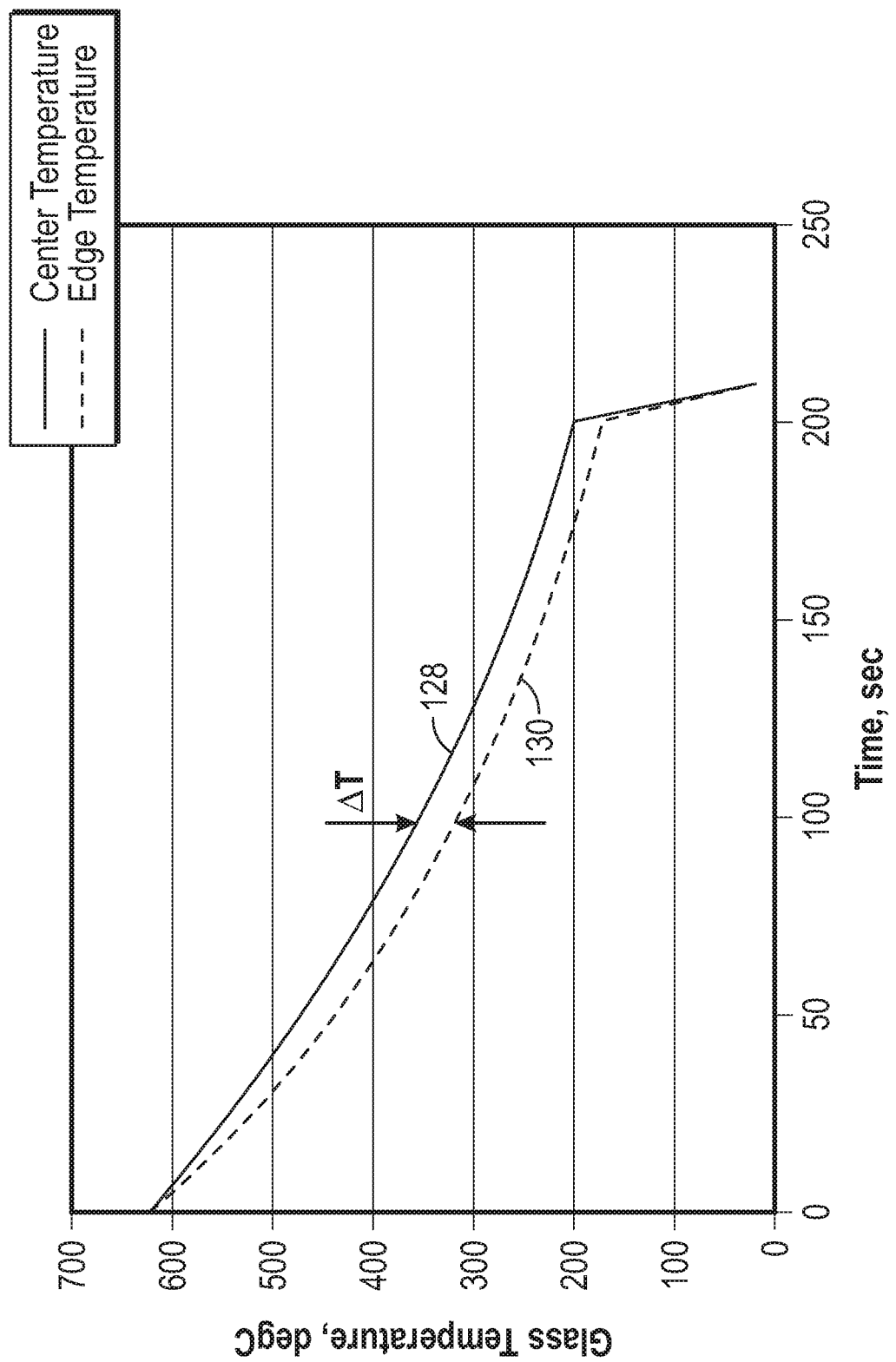
FIG. 8 is a graphical depiction of the center and edge temperatures, as a function of time during a differential cooling process of FIG. 6, according to one or more embodiments.

In any case, and as shown in FIG. 7, the cooling system 124 may result in cooling the outer peripheral edge 102 of the glass more quickly than the center portion 103 of the glass ply 110. For purposes of depiction, the temperature ranges have been assigned zones. A cross-section of a half of a ply of glass 110 is shown where the left side of the figure is the center 103 of the overall ply of glass and the right side of the glass is the peripheral edge 102 of the ply of glass 110. As shown, at a particular moment in time during the cooling process, the center temperature is approximately 626° C. and that temperature is relatively consistent throughout the ply of glass until it approaches the outer edge. At or near the outer edge, the temperature of the glass drops off considerably from 626° C. down to 590° C. While FIG. 7 shows a snapshot in time, FIG. 8 shows a graph of the center temperature 128 and the edge temperature 130 over a time as the ply of glass 110 is cooled. As shown, immediately or shortly after the hot-forming process, both the center portion 103 of the glass and the edge portion 102 of the glass may be at approximately 625° C. As the cooling process starts, the edge portion 102 may cool off more quickly establishing a difference in temperature between the edge portion 102 and the center portion 103 throughout the cooling process. The amount of differential cooling may be selected to induce compressive forces in the outer peripheral edge 102 of the glass ply 110 while balancing that against inducing overly high tensile stresses in adjacent areas of the glass ply 110. In one or more embodiments, the temperature differential in the glass may range from approximately 0° C. to approximately 50° C., or from approximately 10° C. to approximately 40° C., or approximately 14° C. to approximately 25° C., or approximately 20, 25, 30 or 35° C. As the end of the cooling process approaches, and the center of the ply 103 of glass approaches 200° C., a faster cooling process may draw the glass temperature down to room temperature. In one or more embodiments, the temperature differential may be created and maintained throughout the viscoelastic region (e.g., approximately 400° C. to approximately 600° C.).

Figure 9:
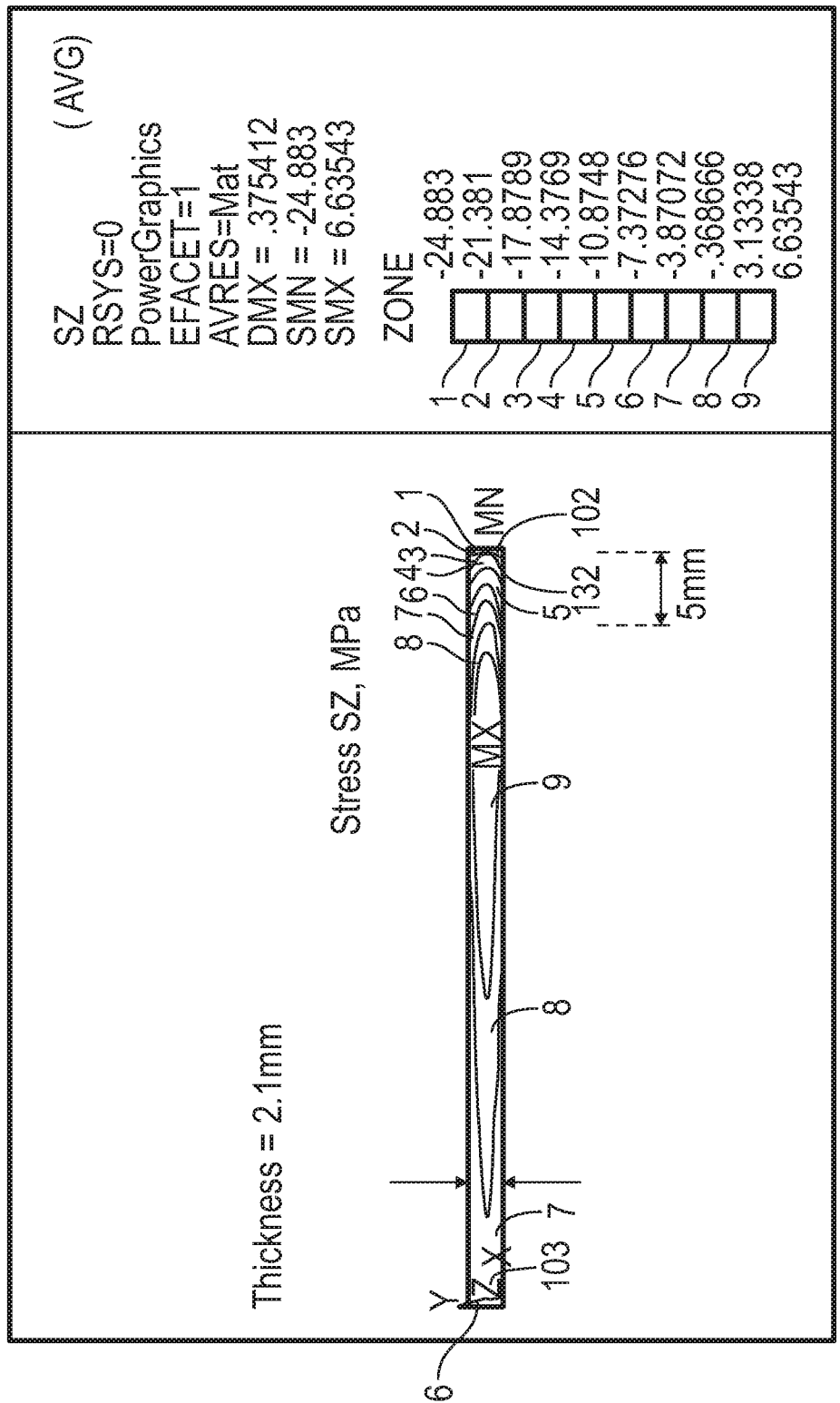
FIG. 9 is a cross-sectional stress diagram showing stress distributions in an outer ply of a laminate after cold forming with an inner ply, according to one or more embodiments.

As shown in FIG. 9, a cross-sectional view of a half of the outer ply of glass 110 is shown depicting the residual stresses in the outer ply of glass 110 after the differential cooling process. For purposes of depiction, the temperature ranges have been assigned zones. As shown, at the left-hand side of the figure depicting the center portion 103 of the outer ply of glass 110, the residual stresses may be approximately 0 MPa. As you move across the cross-section from left to right, the residual stress may increase up to approximately 3 MPa and then up to 6 MPa. This may be due to the peripheral edge cooling sooner than the center of the glass ply and when the center portion cools, it may pull on the peripheral portion creating tension in this area. As you approach the right edge of the diagram and, thus, the peripheral edge 102 of the outer ply of glass 110, the stress drops off quickly from 6 MPa to 0 MPa and within a perimeter region 132, the stress includes increasing amounts of compression from approximately −10 MPa up to approximately −25 MPa. As such, prior to cold forming with the inner ply 108, the outer ply 110 may include pre-formed residual compressive stresses in a peripheral portion ranging from approximately 5 MPa to approximately 30 MPa, or approximately 8 MPa to approximately 27 MPa, or approximately 10 MPa to approximately 25 MPa. The perimeter region 132 may include a peripheral width of the glass ply defined by where the peripheral cooling has been applied during the cooling process. In one or more embodiments, the perimeter region 132 may range from approximately 2 mm to approximately 10 mm, or from approximately 3 mm to approximately 6 mm, or the perimeter region may have a width of approximately 5 mm.

Figure 10:
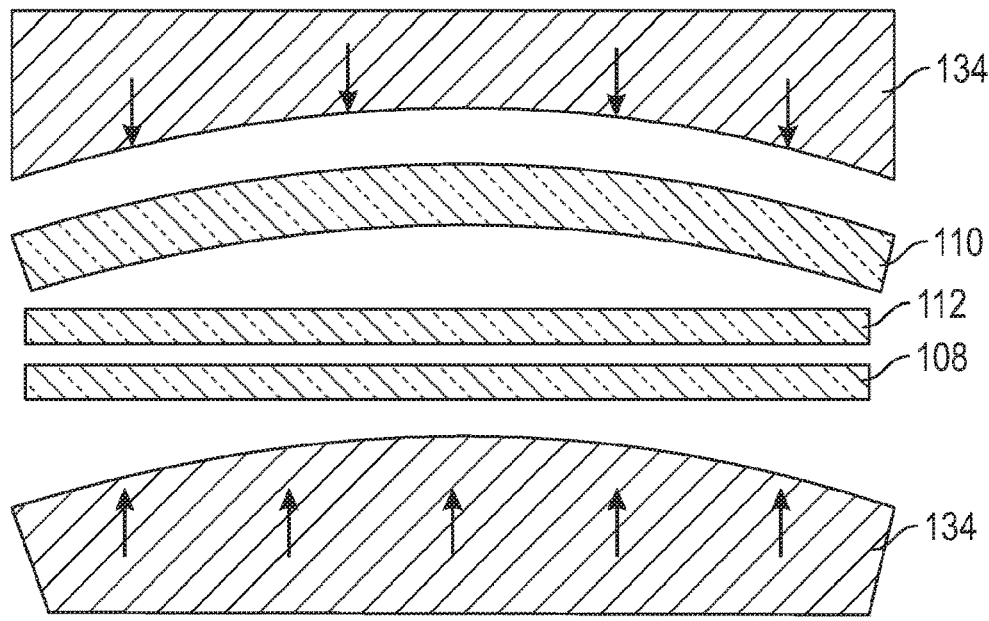
FIG. 10 is a schematic diagram showing a cold-forming process used to laminate an inner ply of glass to a pre-formed and edge-cooled outer ply of glass, according to one or more embodiments.
Figure 11:
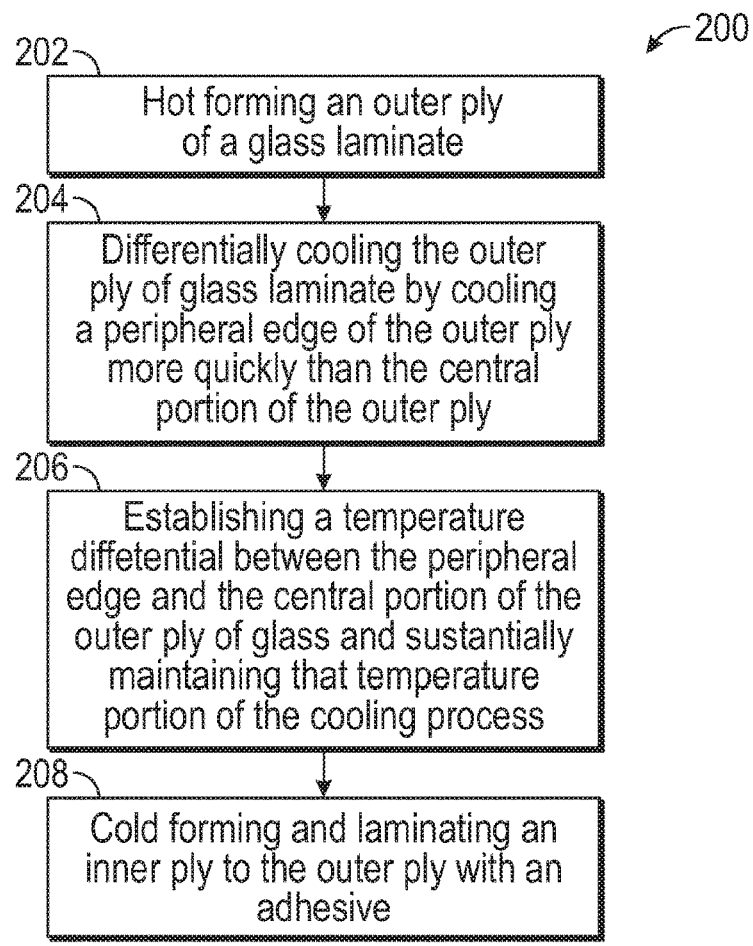
FIG. 11 is a diagram of a method of forming a glass laminate, according to one or more embodiments.

Turning now to FIG. 10, a cold-forming process is shown for forming the inner ply 108 and laminating the inner ply 108 to the pre-formed stress induced outer ply 110. As shown, the method may include arranging an adhesive 112 between the inner ply 108 and outer ply 110. This may include arranging synthetic sheets between the plies or it may include applying a resin to the adhesive side surface of one or both of the plies. The plies of glass 108, 110 and the adhesive 112 may be heated to a cold-forming temperature, for example below approximately 140° C. The plies of glass 108, 110 and the adhesive 112 may be pressed together using a press equipped with pre-shaped dies 134, for example. The dies 134 may be shaped to maintain the shape and curvature of the pre-formed outer ply 110 and to conform the shape of the inner ply 108 to the shape of the outer ply 110. As such, and as originally shown in FIGS. 1 and 2, the pressures applied may result in a shaped laminate.

The cold forming process together with the residual stresses already present in the pre-formed outer ply may result in a more suitable distribution of post-formed stresses in the completed laminate. In particular, the post-formed residual stresses at or near the peripheral edge 102 of the outer ply 110 may include compressive stresses ranging from approximately 7 MPa to approximately 28 MPa or from approximately 10 MPa to approximately 25 MPa, or from approximately 10 MPa to approximately 15 MPa. Moreover, the residual stresses in the peripheral edge 102 of the outer ply 110 of the laminate 100 may be selected by adjusting the cooling process to induce higher or lower residual compressive stresses in the outer peripheral edge 102 of the outer ply 110 during the cooling process after hot-forming the outer ply 110. For example, depending on the geometry of the glass ply and the desired locations of particular stresses, the cooling of the peripheral edge 102 may be uniform around the peripheral edge 102 or some areas may be cooled more than other areas. For example, and in general, where more or higher compressive stresses in the edge are desired, more cooling may be provided in those areas. Accordingly, and with knowledge of the effects of cold forming, a user may selectively induce compressive stresses in the outer ply 110 to combat, reduce, or alleviate effect of the cold-forming process on particular portions of the peripheral edge 102 of the outer ply 110. The additional cooling may be provided by providing cooler gas, more gas at a same or similar temperature, and through adjusting the amount of the peripheral edge 102 that the cooling is applied to. In one or more embodiments, additional cooling may be provided by providing cooling from both sides in one or more locations or throughout the full perimeter of the ply of glass.

A method 200 for forming a glass laminate that is resistant to breakage, cracking, crack propagation, and/or optical distortion may be provided. The method may include hot forming an outer ply of a glass laminate (202). The outer ply may be the same or similar to the outer ply described herein and, as such, may be relatively thick and relatively low in strength. The hot forming process may include heating the outer ply to a temperature meeting or exceeding the glass transition point of the outer ply and using a press with a die sized and shaped to form a desired glass shape such as a shape of a windshield or other automotive glazing. The method may also include differentially cooling the outer ply of glass laminate by cooling a peripheral edge of the outer ply more quickly than the central portion of the outer ply (204). Differentially cooling may include establishing a temperature differential between the peripheral edge and the central portion of the outer ply of glass and substantially maintaining that temperature differential throughout a large portion of the cooling process (206). In one or more embodiments, the temperature differential may range from approximately 14° C. to approximately 25° C. An inner ply of material may then be cold formed/laminated to the outer ply with an adhesive (208). The inner ply may be the same or similar to the inner ply described herein and, as such, may be relatively thin and relatively high in strength. The cold forming and laminating process may involve heating the inner ply of the laminate to a cold-forming temperature of less than 140° C., for example. The cold forming process may include placing the outer ply, an adhesive layer, and the inner ply in a press with a die designed to maintain the shape of the outer ply while pressing the inner ply to the outer ply and causing the inner ply to conform to the shape of the outer ply. The glass laminate may be suitable for installation into a vehicle or for other uses.

The resulting glass laminate may be more resistant to breakage during cold forming, cracking, delamination, crack propagation, optical distortion or breakage during shipping, installation, or use. That is, the compressive stresses induced during the hot-forming process may resist the otherwise tensile forces induced during cold-forming. That is, while potentially reduced, the residual stresses in the outer ply of the laminate may remain compressive after cold-forming and, as such, may make the outer ply more stable and less susceptible to the mentioned defects.

It is to be appreciated that while the application has been described in the context of automotive glazing and, as such, has suggested the outer ply may be thicker and less strong than the thinner and stronger inner ply, the laminate may be reversed. Moreover, particular properties of the inner ply and the outer ply may be swapped as well. For example, the outer ply may be thinner than the inner ply and/or the outer ply may be stronger than the inner ply. Still other reversals and substitutions may be provided. Still further, additional plies outside the mentioned plies or within the cross-section described may also be provided without departing from the present disclosure.

Various embodiments of the present disclosure may be described herein with reference to flowchart illustrations and/or block diagrams of methods, apparatus (systems), and computer program products. Although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the disclosure to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A cold-formed glass laminate, comprising:
a first ply of glass with a first thickness and a first strength, the first ply having pre-formed residual compressive stresses in a peripheral edge portion adapted to offset tensile stresses resulting from a cold-forming process;

a second ply of glass with a second thickness less than the first thickness and a second strength greater than the first strength, wherein, during the cold-forming process, the second ply is cold-formed against a concave surface of the first ply;

an adhesive arranged between the first ply and the second ply; and wherein as a result of the pre-formed residual compressive stresses, post-formed residual stresses in the peripheral edge portion of the first ply are compressive despite the tensile stresses, wherein the peripheral edge portion comprises a substantially uniform ribbon around the perimeter of the glass laminate.

2. The glass laminate of claim 1, wherein the pre-formed residual compressive stresses range from approximately 10 MPa to approximately 25 MPa.

3. The glass laminate of claim 1, wherein the post-formed residual compressive stress in the peripheral edge portion of the first ply after the cold-forming process ranges from approximately 7 MPa to approximately 28 MPa.

4. The glass laminate of claim 1, wherein the ribbon has a width from approximately 3 mm to approximately 7 mm.

5. The glass laminate of claim 4, wherein the width is approximately 5 mm.

6. The glass laminate of claim 1, wherein the first ply is soda lime glass and the second ply is at least one of chemically strengthened glass, thermally strengthened glass, or mechanically strengthened glass.

7. The glass laminate of claim 1, wherein the glass laminate is configured as at least one of a roof or a windshield for a vehicle.

* * * * *